(12) United States Patent
Matsubara et al.

(10) Patent No.: US 11,114,707 B2
(45) Date of Patent: *Sep. 7, 2021

(54) MONITORING APPARATUS FOR ENERGY STORAGE DEVICE, ENERGY STORAGE APPARATUS, AND A METHOD OF MONITORING ENERGY STORAGE DEVICE

(71) Applicant: GS Yuasa International Ltd., Kyoto (JP)

(72) Inventors: Ryo Matsubara, Kyoto (JP); Takeyuki Shiraishi, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 177 days.

This patent is subject to a terminal disclaimer.

(21) Appl. No.: 16/460,762

(22) Filed: Jul. 2, 2019

(65) Prior Publication Data

US 2019/0326651 A1   Oct. 24, 2019

Related U.S. Application Data

(63) Continuation of application No. 15/552,761, filed as application No. PCT/JP2016/057294 on Mar. 9, 2016, now Pat. No. 10,388,995.

(30) Foreign Application Priority Data

Mar. 25, 2015   (JP) .................................. 2015-061922

(51) Int. Cl.
*H01M 10/44* (2006.01)
*H01M 10/46* (2006.01)
*H01M 10/48* (2006.01)
*B60L 58/22* (2019.01)
(Continued)

(52) U.S. Cl.
CPC ............. *H01M 10/48* (2013.01); *B60L 58/22* (2019.02); *G06F 1/3212* (2013.01);
(Continued)

(58) Field of Classification Search
CPC .... H02J 7/0032; H02J 7/0031; H02J 7/00306; H02J 9/002; B60L 58/22; B60L 3/0046;
(Continued)

(56) References Cited

U.S. PATENT DOCUMENTS 6,584,043 B1   6/2003   Koike et al.
10,388,995 B2 *  8/2019   Matsubara ............ B60L 3/0046
(Continued)

FOREIGN PATENT DOCUMENTS

JP    H 06-4481 A      1/1994
JP    WO 96/15563 A1   5/1996
(Continued)

OTHER PUBLICATIONS

Indian Office Action, dated Nov. 21, 2019, in Indian Application No. 201747028682 and English Translation thereof.
(Continued)

*Primary Examiner* — Edward Tso
(74) *Attorney, Agent, or Firm* — McGinn IP Law Group, PLLC

(57) ABSTRACT

A monitoring apparatus for an energy storage device provided at a movable body and electrically connected to a load of the movable body via a switch, the monitoring apparatus comprising: a monitoring unit supplied with power from the energy storage device; wherein the monitoring unit executes monitoring operation of bringing the switch from a closed state into an opened state under a condition that the energy storage device has voltage not more than a discharge voltage threshold, and bringing the switch from the opened state into the closed state under a condition that the switch is in the opened state and the energy storage device satisfies a predetermined discharge recovery condition, and extends an interval of the monitoring operation when the movable body
(Continued)

is parked while the switch is in the opened state, in comparison to a case where the movable body is not parked.

18 Claims, 3 Drawing Sheets

(51) Int. Cl.
  *H02H 7/18* (2006.01)
  *H02J 7/00* (2006.01)
  *G06F 1/3212* (2019.01)
  *B60L 50/51* (2019.01)

(52) U.S. Cl.
  CPC ............ *H01M 10/482* (2013.01); *H02H 7/18* (2013.01); *H02J 7/0031* (2013.01); *H02J 7/0032* (2013.01); *B60L 50/51* (2019.02); *H01M 10/44* (2013.01); *H02J 7/00306* (2020.01)

(58) Field of Classification Search
  CPC ........ B60L 2240/549; B60L 2240/547; H01M 10/482; H01M 10/44
  USPC .......................... 320/104, 107, 132, 134, 136
  See application file for complete search history.

(56) References Cited

U.S. PATENT DOCUMENTS

| | | |
|---|---|---|
| 2007/0013347 A1 | 1/2007 | Kamohara |
| 2011/0205678 A1 | 8/2011 | Baba et al. |
| 2011/0316520 A1 | 12/2011 | Kawahara et al. |
| 2012/0306506 A1 | 12/2012 | Kiuchi |
| 2014/0159671 A1 | 6/2014 | Kawahara et al. |
| 2017/0045025 A1 | 2/2017 | Nakayama |

FOREIGN PATENT DOCUMENTS

| | | |
|---|---|---|
| JP | H 09-191569 A | 7/1997 |
| JP | H 10-509579 A | 9/1998 |
| JP | H 11-283677 A | 10/1999 |
| JP | 2004-004141 A | 1/2004 |
| JP | 2007-026696 A | 2/2007 |
| JP | 2011-176940 A | 9/2011 |
| JP | 2014-018065 A | 1/2014 |
| JP | 2014-036529 A | 2/2014 |
| JP | 2014-138508 A | 7/2014 |
| WO | WO 2013/001620 A1 | 1/2013 |
| WO | WO 2013/115035 A1 | 8/2013 |

OTHER PUBLICATIONS

Notice of Allowance in U.S. Appl. No. 15/552,761 dated Apr. 8, 2019.
Machine translation of WO 2013/115035 (Aug. 8, 2013) (Year: 2013).
International Search Report (ISR) (PCT Form PCT/ISA/210), in PCT/JP2016/057294, dated Jun. 7, 2016.

\* cited by examiner

MONITORING APPARATUS FOR ENERGY STORAGE DEVICE, ENERGY STORAGE APPARATUS, AND A METHOD OF MONITORING ENERGY STORAGE DEVICE

The present application is a Continuation Application of U.S. patent application Ser. No. 15/552,761, filed on Aug. 22, 2017, which is based on International Patent Application No. PCT/JP2016/057294, filed on Mar. 9, 2016, and Japanese Patent Application No. 2015-061922, filed on Mar. 25, 2015, the contents of which is incorporated herein by reference in its entirety.

TECHNICAL FIELD

The present application discloses a technique relating to a monitoring apparatus for an energy storage device, an energy storage apparatus, and a method of monitoring the energy storage device.

BACKGROUND ART

There is a monitoring apparatus for an energy storage device (secondary battery) electrically connected to a load via a switch (see Patent Document 1 and the like). The monitoring apparatus is supplied with power from the secondary battery to acquire voltage of the secondary battery. The monitoring apparatus repetitively executes monitoring operation of bringing the switch from a closed state into an opened state when a value of the acquired voltage of the secondary battery becomes lower than a predetermined lower limit voltage value, and then bringing the switch from the opened state into the closed state when the voltage value of the secondary battery becomes higher than the lower limit voltage value. When the voltage value of the secondary battery becomes approximate to the lower limit voltage value, the monitoring apparatus shortens an interval of monitoring operation to promptly detect an overdischarging state of the secondary battery and bring the switch into the opened state for protection of the secondary battery.

PRIOR ART DOCUMENT

Patent Document

Patent Document 1: JP-A-2011-176940

SUMMARY OF THE INVENTION

Problem to be Solved by the Invention

The conventional monitoring apparatus for the energy storage device is not sufficiently configured to appropriately set the interval of monitoring operation after the switch comes into the opened state, and may thus decrease the voltage of the energy storage device.

In order to solve the problem, the present application discloses a monitoring apparatus for an energy storage device, an energy storage apparatus, and a method of monitoring the energy storage device, which inhibit decrease in voltage of the energy storage device.

Means for Solving the Problem

In order to achieve the object mentioned above, the present application discloses a monitoring apparatus for an energy storage device provided at a movable body and electrically connected to a load of the movable body via a switch, the monitoring apparatus including: a monitoring unit supplied with power from the energy storage device; in which the monitoring unit executes monitoring operation of bringing the switch from a closed state into an opened state under a condition that the energy storage device has voltage not more than a discharge voltage threshold, and bringing the switch from the opened state into the closed state under a condition that the switch is in the opened state and the energy storage device satisfies a predetermined discharge recovery condition, and decreases power consumption by extending an interval of the monitoring operation when the load is under suspension while the switch is in the opened state, in comparison to a case where the load is in operation.

The technique disclosed in the present application can be embodied in various modes, such as an apparatus or a method of monitoring an energy storage device, an energy storage apparatus including the apparatus and an energy storage device, a computer program and an integrated circuit configured to achieve functions of the apparatus or the method, a nontemporal recording medium like a CD-ROM storing the computer program, and a transmission medium like the Internet.

MODE FOR CARRYING OUT THE INVENTION

Figure 1:
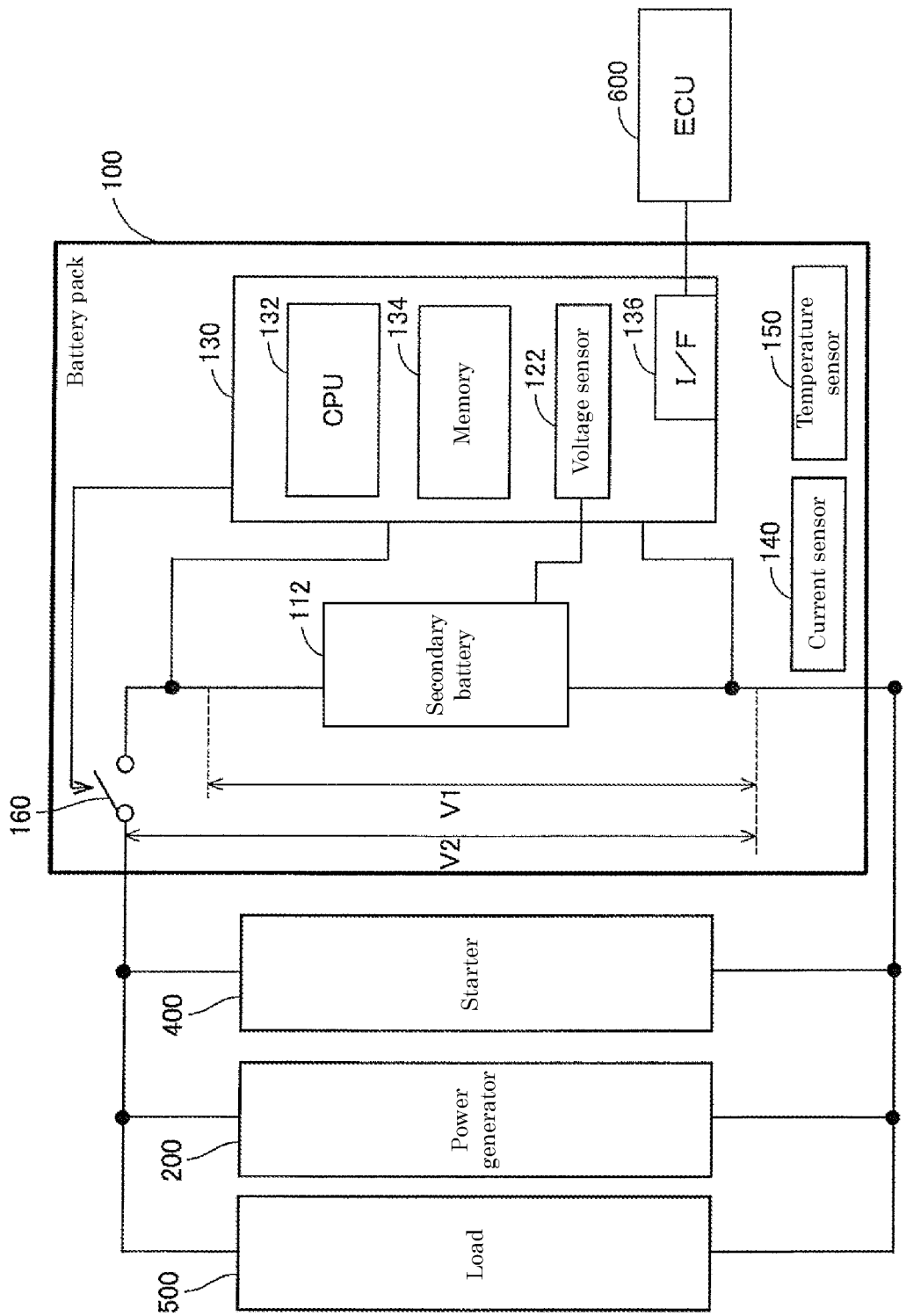
FIG. 1 is an explanatory view depicting a configuration of a battery pack according to an embodiment.

The conventional monitoring apparatus described above is not sufficiently configured to appropriately set the interval of monitoring operation after the switch comes into the opened state. Assume that the interval of monitoring operation is shortened even after the switch comes into the opened state. When the secondary battery is no more in the overdischarging state, the switch can then be brought into the closed state to quickly recover the state where the secondary battery supplies the load with power. Meanwhile, shortening the interval of monitoring operation causes increase in power consumption by the monitoring apparatus at least by power required to be supplied from the secondary battery to the monitoring apparatus at each of the short intervals. The voltage of the secondary battery is then further decreased to be lower than minimum operating voltage or the like of the monitoring apparatus, which may thus become inoperable. Furthermore, a secondary battery having continuously decreasing voltage may not be reused. These problems are not unique to secondary batteries but are applicable also to a monitoring apparatus for a different energy storage device such as a capacitor.

The present application discloses a technique to solve at least part of the problems mentioned above.

(1) The present application discloses a monitoring apparatus for an energy storage device provided at a movable body and electrically connected to a load of the movable body via a switch, the monitoring apparatus including: a monitoring unit supplied with power from the energy storage device; in which the monitoring unit executes monitoring operation of bringing the switch from a closed state into an opened state under a condition that the energy storage device has voltage not more than a discharge voltage threshold, and bringing the switch from the opened state into the closed state under a condition that the switch is in the opened state and the energy storage device satisfies a predetermined discharge recovery condition, and decreases power consumption by extending an interval of the monitoring operation when the load is under suspension while the switch is in the opened state, in comparison to a case where the load is in operation. While the switch is in the opened state, it is highly required to promptly restart power supply to the load in operation. In comparison to the case where the load is in operation, it is not highly required to promptly restart power supply to the load under suspension. In view of this, when the load is under suspension while the switch is in the opened state, the monitoring apparatus for the energy storage device executes monitoring operation at the longer interval with less power consumption from the energy storage device, in comparison to the case where the load is in operation. While the switch is in the opened state, this inhibits delayed restart of power supply to the load when the load is in operation and the energy storage device satisfies the discharge recovery condition, as well as inhibits decrease in voltage of the energy storage device due to power consumption by the monitoring unit while the load is under suspension with relatively low necessity for restart of power supply to the load.

(2) In the monitoring apparatus for the energy storage device, optionally, the energy storage device is further electrically connected, via the switch, to a charger configured to generate power with an engine of the movable body, the monitoring operation further includes bringing the switch from the closed state into the opened state under a condition that the voltage of the energy storage device becomes not less than a charge voltage threshold larger than the discharge voltage threshold, and bringing the switch from the opened state into the closed state under a condition that the energy storage device satisfies a predetermined charge recovery condition when the switch is in the opened state, and the monitoring unit increases power consumption by shortening the interval of the monitoring operation when the voltage of the energy storage device becomes not less than the charge voltage threshold to bring the switch into the opened state while the load is under suspension, in comparison to a case where the voltage of the energy storage device becomes not more than the discharge voltage threshold to bring the switch into the opened state. When the voltage of the energy storage device becomes not less than the charge voltage threshold to bring the switch into the opened state, it is desired to decrease the voltage of the energy storage device through discharge. In view of this, when the voltage of the energy storage device becomes not less than the charge voltage threshold to bring the switch into the opened state while the load is under suspension, the monitoring apparatus for the energy storage device executes monitoring operation at the shorter interval with more power consumption from the energy storage device, in comparison to the case where the voltage of the energy storage device becomes not more than the discharge voltage threshold to bring the switch into the opened state. When the voltage of the energy storage device becomes not less than the charge voltage threshold to bring the switch into the opened state while the load is under suspension, the voltage of the energy storage device can be decreased promptly to cancel the state where the voltage of the energy storage device is not less than the charge voltage threshold.

(3) The monitoring apparatus for the energy storage device can be configured such that, when the voltage of the energy storage device becomes not less than the charge voltage threshold to bring the switch into the opened state while the load is under suspension, power consumption is increased by shortening the interval of the monitoring operation in comparison to a case where the switch is in the closed state. When the voltage of the energy storage device becomes not less than the charge voltage threshold to bring the switch into the opened state while the load is under suspension, the monitoring apparatus for the energy storage device can promptly restart power supply to the load at the start of operation of the load.

(4) The monitoring apparatus for the energy storage device can be configured such that the monitoring unit further decreases power consumption by extending the interval of the monitoring operation when the voltage of the energy storage device becomes not more than a low voltage threshold lower than the discharge voltage threshold while the switch is in the opened state, in comparison to a case where the voltage of the energy storage device is larger than the low voltage threshold. The monitoring apparatus for the energy storage device can inhibit further decrease in voltage of the energy storage device in an exemplary case where the switch is in the opened state for a long period.

A monitoring apparatus for an energy storage device according to the present embodiment will be described below with reference to the drawings. Each of embodiments to be described hereinafter will relate to a preferred specific example of the present invention. The following embodiments refer to numerical values, shapes, materials, constituent elements, positions and connection modes of the constituent elements, steps in a method, orders of the steps, and the like, which are merely exemplary and are not intended to limit the present invention. In the constituent elements according to the following embodiments, those not recited in independent claims disclosing the most superordinate concept will be described as optional constituent elements. The accompanying drawings are schematic and are not necessarily depicted exactly.

A. Embodiments

A-1. Configuration of Battery Pack

FIG. 1 is an explanatory view schematically depicting a configuration of a battery pack 100 according to the present embodiment. The battery pack 100 is provided at a movable body such as a vehicle like an automobile exemplified by a hybrid vehicle (HV) and equipped with an engine (not depicted) as a driving source, and functions as a battery for a starter 400 configured to start the engine. The battery pack 100 is charged by a power generator 200 configured to be driven (to generate power) by the engine of the movable body such as an alternator. The battery pack 100 further supplies a load 500 of an electric component or the like of the automobile with power. Specifically, the movable body includes, in addition to the battery pack 100, the engine, the power generator 200, the starter 400, and the load 500. The battery pack 100 exemplifies an energy storage apparatus, and the power generator 200 exemplifies a charger. Examples of the movable body include, in addition to the automobile, various movable objects such as a motorcycle, a motorized bicycle, an electric bicycle, and a railroad vehicle. The load described above is a power load consumed in the movable body used by a user such as a passenger.

The battery pack 100 includes a secondary battery 112, a monitoring apparatus 130, a current sensor 140, a temperature sensor 150, and a relay 160.

The secondary battery 112 is electrically connected with the power generator 200, the starter 400 configured to start the engine, and the load 500 of the movable body, via the relay 160. In a case where the relay 160 is in a closed state, the secondary battery 112 comes into a chargeable-dischargeable state where the secondary battery 112 can supply the starter 400 and the load 500 with power and the power generator 200 can charge the secondary battery 112. In another case where the relay 160 is in an opened state, the secondary battery 112 comes into a nonchargeable-nondischargeable state where the secondary battery 112 cannot supply the starter 400 or the load 500 with power and the power generator 200 cannot charge the secondary battery 112. The relay 160 exemplifies a switch.

The secondary battery 112 includes a plurality of cells (not depicted) connected in series. Each of the cells is configured by a lithium ion secondary battery or the like. The secondary battery 112 can be used in a voltage range between a predetermined upper limit voltage value VT1 and a predetermined lower limit voltage value VT2. The secondary battery 112 exemplifies an energy storage device.

The current sensor 140 outputs a detection signal according to charge current to the secondary battery 112 by the power generator 200 or discharge current from the secondary battery 112 to the load 500 (hereinafter, collectively referred to as "charge-discharge current"). The temperature sensor 150 is configured by a thermistor or the like, and outputs a detection signal according to temperature of the secondary battery 112.

The monitoring apparatus 130 is electrically connected to the secondary battery 112 via a signal line, and is brought into an operable state by power supply from the secondary battery 112. The monitoring apparatus 130 includes a voltage sensor 122, a CPU 132, a memory 134, and a communication interface (I/F) 136.

The voltage sensor 122 outputs a detection signal according to a terminal voltage value V1 of the secondary battery 112 and total voltage V2 of the secondary battery 112 and the relay 160. The memory 134 is configured by a RAM, a ROM, or the like, and stores various programs. The CPU 132 refers to information transmitted from the sensors and control operation of the respective portions in the battery pack 100 in accordance with the programs read out of the memory 134. For example, the CPU 132 transmits an open command signal to the relay 160 to bring the relay 160 into the opened state, and transmits a close command signal to bring the relay 160 into the closed state.

The CPU 132 acquires the terminal voltage value V1 (or V2) of the secondary battery 112 in accordance with the detection signal from the voltage sensor 122, acquires amperage of the charge-discharge current in accordance with the detection signal from the current sensor 140, and acquires temperature of the secondary battery 112 in accordance with the detection signal from the temperature sensor 150. The monitoring apparatus 130 is operable at a minimum operating voltage value VT4 that is lower than the lower limit voltage value VT2 of the secondary battery 112. The communication interface 136 is configured to communicate with an external device such as an engine control unit (hereinafter, referred to as an ECU) 600. The CPU 132 exemplifies a monitoring unit.

The power generator 200 includes an AC/DC converter and a DC/DC converter (not depicted), and outputs power used for charging the battery pack 100.

A-2. Processing of Monitoring Secondary Battery 112

Figure 2:
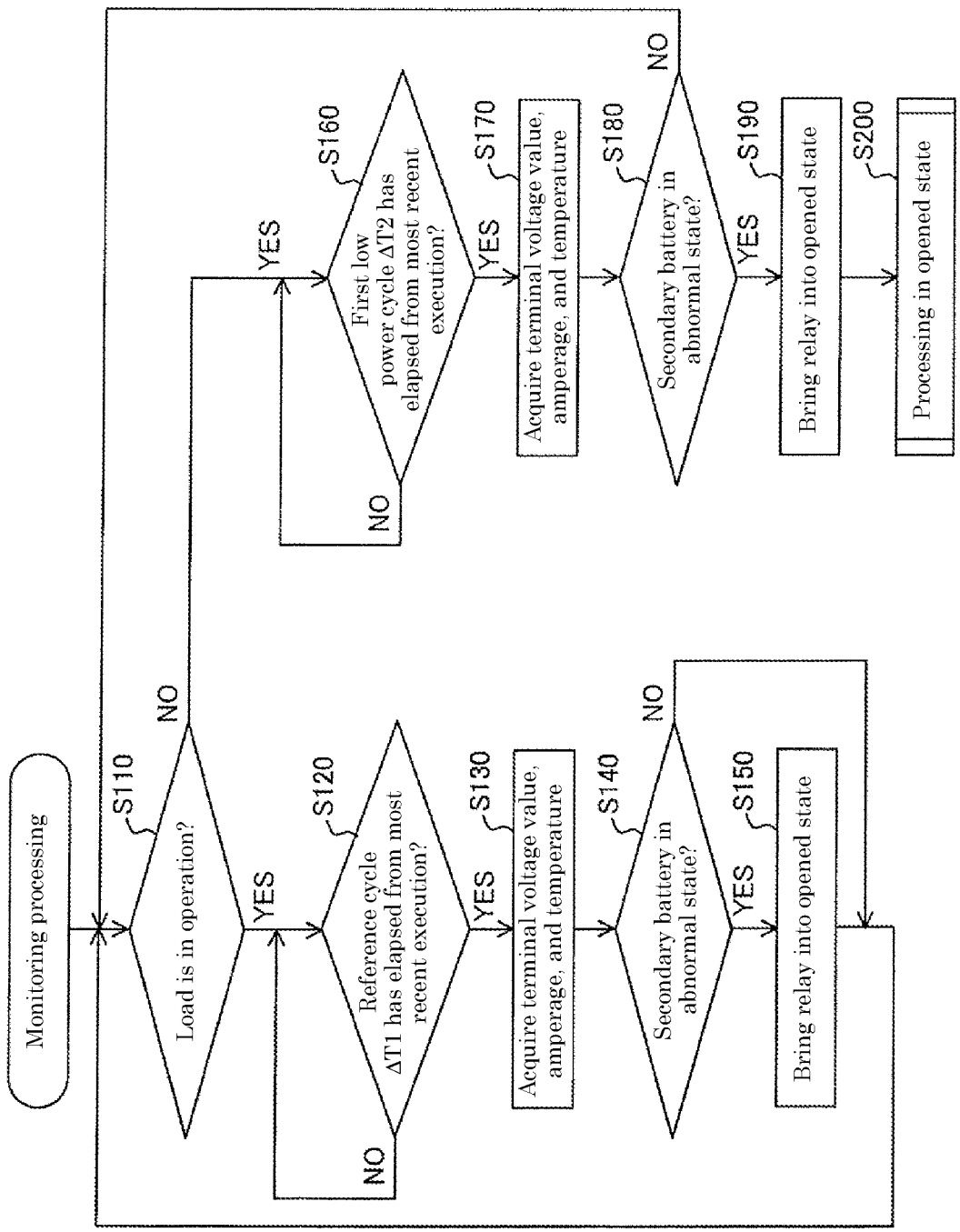
FIG. 2 is a flowchart depicting a process flow of monitoring a secondary battery according to the embodiment.

The monitoring apparatus 130 executes processing of monitoring the secondary battery 112 under a condition that the secondary battery 112 supplies power having a voltage value not less than the minimum operating voltage value VT4. FIG. 2 is a flowchart depicting a process flow of monitoring the secondary battery. This monitoring processing is executed to monitor the state of the secondary battery 112 and inhibit the secondary battery 112 from coming into an abnormal state. Assume that the relay 160 is in the closed state at the start of monitoring processing.

The CPU 132 of the monitoring apparatus 130 initially determines whether or not the load 500 is in operation (S110). The CPU 132 receives a signal indicating a state of an ignition or the like from the ECU 600, and determines in accordance with the received signal that the load 500 is in operation if the ignition is ON and that the load 500 is under suspension if the ignition is OFF. The state where the load 500 is in operation can be expressed such that the load 500 in the movable body is being supplied with power or that the movable body is in operation by supply of the power. The state where the load 500 is under suspension can be expressed such that the load 500 in the movable body is not being supplied with power or that the movable body is under suspension by stopped supply of the power.

In a case where the battery pack 100 is equipped on a start-stop system vehicle, the CPU 132 receives, from the ECU 600, a signal indicating the state of the ignition and a signal indicating whether or not the engine is in operation. The CPU 132 determines, in accordance with the received signals, that the movable body is stopped without idling, that is, the load 500 is in operation, under a condition that the ignition is ON and the engine is under suspension. The CPU 132 according to the present embodiment also determines that the load 500 is in operation when the movable body (vehicle) is stopped, because the movable body is ready to travel promptly as in the case where the movable body is stopped without idling.

In other words, the state where the load 500 is in operation includes the states where the movable body such as a vehicle is traveling, is traveling at high speed, is stopped without idling, or is stopped. The state where the load 500 is under suspension indicates a state where the movable body such as a vehicle is parked or is parked for a long period.

The CPU 132 executes first reference operation processing (S120 to S150) if the load 500 is determined as being in operation (YES in S110), and executes first low power consumption processing (S160 to S190) if the load 500 is determined as being under suspension, in other words, being stopped (NO in S110).

A-2-1. First Reference Operation Processing:

In the first reference operation processing, while the relay 160 is in the closed state, the CPU 132 of the monitoring apparatus 130 or the like is constantly activated, consumes power from the secondary battery 112, and repetitively executes operation of monitoring of the secondary battery 112 (S130 to S150) at a reference cycle ΔT1 (e.g. several tens to several hundreds of msec). The first reference operation processing is executed when frequent operation of monitoring the secondary battery 112 is relatively highly required due to frequent charge-discharge of the secondary battery 112 while the engine or the load 500 is in operation, for example. The reference cycle ΔT1 exemplifies an interval of monitoring operation.

Specifically, the CPU 132 determines whether or not the reference cycle ΔT1 has elapsed from execution of the most recent monitoring operation (S120). At the start of monitoring processing, the CPU 132 determines whether or not time corresponding to the reference cycle ΔT1 has elapsed from the start of the monitoring processing.

The CPU 132 stands by if the CPU 132 determines that the reference cycle ΔT1 has not elapsed from execution of the most recent monitoring operation (NO in S120), and executes monitoring operation if the CPU 132 determines that the reference cycle ΔT1 has elapsed from execution of the most recent monitoring operation (YES in S120). Specifically, the CPU 132 acquires the terminal voltage value V, the amperage of the charge-discharge current, and the temperature of the secondary battery 112 (S130), and determines whether or not the secondary battery 112 is in an abnormal state in accordance with the acquired results (S140).

The CPU 132 according to the present embodiment determines whether or not the secondary battery 112 is in an abnormal state of either one of an overdischarging state, an overcharged state, an excessive current state, and a temperature abnormal state. In the overdischarging state, the terminal voltage value V of the secondary battery 112 is not more than the lower limit voltage value VT2. In the overcharged state, the terminal voltage value V of the secondary battery 112 is not less than the upper limit voltage value VT1. In the excessive current state, the amperage of the charge-discharge current of the secondary battery 112 per unit time is not less than a defined level. In the temperature abnormal state, the temperature of the secondary battery 112 is not less than a defined level. The lower limit voltage value VT2 exemplifies a discharge voltage threshold and the upper limit voltage value VT1 exemplifies a charge voltage threshold.

In a case where the CPU 132 determines that the secondary battery 112 is in an abnormal state (YES in S140), the CPU 132 brings the relay 160 from the closed state into the opened state (S150). This brings the secondary battery 112 into the nonchargeable-nondischargeable state to inhibit decrease in voltage of the secondary battery 112 due to discharge to the starter 400 or the load 500. In other words, this inhibits the secondary battery 112 from coming into an abnormal state or from deteriorating the abnormal state for protection of the secondary battery 112. The secondary battery 112, however, may supply the monitoring apparatus 130 with power to cause decrease in voltage of the secondary battery 112. The CPU 132 brings the relay 160 into the opened state, and the process flow then returns to step S110.

In another case where the CPU 132 determines that the secondary battery 112 is not in an abnormal state (NO in S140), the CPU 132 keeps the relay 160 in the closed state and the process flow returns to step S110. The first reference operation processing includes operation of monitoring the secondary battery 112 at the reference cycle ΔT1 regardless of whether the relay 160 is in the opened state or in the closed state. Even when the relay 160 is in the opened state, charging the secondary battery 112 can be started promptly to return a power source system of the vehicle to a normal state upon high output from the power generator 200. As described above, the load 500 is determined as being in operation in step S110 (YES in S110) in the both cases where the movable body is stopped without idling and is stopped. The first reference operation processing is thus executed in this case. While the movable body is stopped without idling and is stopped, the engine is under suspension but a driver at a driver's seat is expected to find overdischarge of the secondary battery 112 and execute charging work relatively shortly.

A-2-2. First Low Power Consumption Processing:

In the first low power consumption processing, while the relay 160 is in the closed state, the CPU 132 of the monitoring apparatus 130 is temporarily activated from a stopped state and consumes power from the secondary battery 112 to repetitively execute operation of monitoring the secondary battery 112 (S170 to S190) at a first low power cycle ΔT2 (>ΔT1, e.g. several tens of sec) longer than the reference cycle ΔT1. The first low power consumption processing is executed when frequent operation of monitoring the secondary battery 112 is relatively less required because the secondary battery 112 has discharge amperage approximate to a dark current amount in a case where the load 500 is under suspension and the vehicle is parked, as to be described later. In other words, the CPU 132 of the monitoring apparatus 130 extends the interval of monitoring operation to suppress power consumption. The first low power cycle ΔT2 exemplifies an interval of monitoring operation.

Specifically, the CPU 132 determines whether or not the first low power cycle ΔT2 has elapsed from execution of the most recent monitoring operation (S160). At the start of monitoring processing, the CPU 132 determines whether or not time corresponding to the first low power cycle ΔT2 has elapsed from the start of the monitoring processing.

The CPU 132 stands by if the CPU 132 determines that the first low power cycle ΔT2 has not elapsed from execution of the most recent monitoring operation (NO in S160), and executes monitoring operation if the CPU 132 determines that the first low power cycle ΔT2 has elapsed from execution of the most recent monitoring operation (YES in S160). Specifically, the CPU 132 acquires the terminal voltage value V, the amperage of the charge-discharge current, and the temperature of the secondary battery 112 (S170), and determines whether or not the secondary battery 112 is in an abnormal state in accordance with the acquired results (S180). The abnormal state is similar to that in the processing in step S140. Examples of the abnormal state have only to at least include the overdischarging state, and the remaining examples can be different from those in the processing in step S140.

In a case where the CPU 132 determines that the secondary battery 112 is not in an abnormal state (NO in S180), the CPU 132 keeps the relay 160 in the closed state and the process flow returns to step S110. In another case where the CPU 132 determines that the secondary battery 112 is in an abnormal state (YES in S180), the CPU 132 brings the relay 160 from the closed state into the opened state (S190) and executes processing in the opened state depicted in FIG. 3 (S200).

A-2-3. Processing in Opened State:

The processing in the opened state relates to operation of monitoring the secondary battery 112 with the relay 160 being in the opened state. The CPU 132 determines whether or not the secondary battery 112 is in the overdischarging state (S320). In the processing in step S320, the CPU 132 can alternatively determine whether or not the abnormal state determined in the processing in step S180 in FIG. 2 corresponds to the overdischarging state. In a case where the secondary battery 112 is in an abnormal state such as the overcharged state other than the overdischarging state, the CPU 132 determines that the secondary battery 112 is not in the overdischarging state (NO in S320) and executes second reference operation processing (S380 to S410). In another case where the secondary battery 112 is in the overdischarging state, the CPU 132 determines that the secondary battery 112 is in the overdischarging state (YES in S320) and executes second low power consumption operation processing (S330 to S350 and S410).

A-2-4. Second Reference Operation Processing:

In the second reference operation processing, while the relay 160 is in the opened state, the CPU 132 of the monitoring apparatus 130 or the like is constantly activated, consumes power from the secondary battery 112, and repetitively executes operation of monitoring the secondary battery 112 (S390 to S410) at the reference cycle ΔT1. Specifically, the CPU 132 determines whether or not the reference cycle ΔT1 has elapsed from execution of the most recent monitoring operation (including S130 to S150 and S170 to S190) (S380). The CPU 132 stands by if the CPU 132 determines that the reference cycle ΔT1 has not elapsed from execution of the most recent monitoring operation (NO in S380), and executes monitoring operation if the CPU 132 determines that the reference cycle ΔT1 has elapsed from execution of the most recent monitoring operation (YES in S380). Specifically, the CPU 132 acquires the terminal voltage value V, the amperage of the charge-discharge current, and the temperature of the secondary battery 112 (S390), and determines whether or not the abnormal state of the secondary battery 112 is canceled in accordance with the acquired results, in other words, whether or not the secondary battery 112 is in a normal state different from any one of the above examples of the abnormal state (S400). In the present embodiment, the CPU 132 determines that the overcharged state of the secondary battery 112 is canceled under a condition that the secondary battery 112 does not receive voltage not less than present voltage of the secondary battery 112 and the terminal voltage of the secondary battery 112 becomes not more than charge recovery voltage (larger than the lower limit voltage value VT2) smaller than the upper limit voltage value VT1. This condition exemplifies a predetermined charge recovery condition.

In a case where the CPU 132 determines that the abnormal state of the secondary battery 112 is canceled (YES in S400), the CPU 132 brings the relay 160 from the opened state into the closed state (S410). The process flow then returns to step S110 in FIG. 2. In another case where the CPU 132 determines that the abnormal state of the secondary battery 112 is not canceled (NO in S400), the CPU 132 keeps the relay 160 in the opened state and the process flow returns to step S320.

Execution of the second reference operation processing achieves the following effects. As described above, the secondary battery 112 comes into the nonchargeable-nondischargeable state when the relay 160 is in the opened state. The secondary battery 112 does not supply the starter 400 of the engine or the load 500 with power even if the ignition is turned ON. Neither the starter 400 nor the load 500 is activated in this case. Assume that the monitoring operation is executed at a relatively long operation cycle when the relay 160 is in the opened state. Even though the secondary battery 112 comes into the normal state, it takes time for the relay 160 to come into the closed state.

In contrast, the second reference operation processing includes operation of monitoring the secondary battery 112 at a relatively short operation cycle. When the secondary battery 112 comes into the normal state, the relay 160 quickly returns into the closed state to bring the secondary battery 112 into the chargeable-dischargeable state. The secondary battery 112 can thus quickly respond to a command to activate the starter 400 and the load 500 by turning ON the ignition or the like. In a case where the secondary battery 112 is in the overcharged state or the like while the relay 160 is in the opened state, execution of monitoring operation at the relatively short reference cycle ΔT1 achieves quick response to a command to activate the starter 400 and the load 500. A shorter operation cycle requires more power consumption by the monitoring apparatus 130 and accordingly decreases the terminal voltage value V of the secondary battery 112. However, particularly when the secondary battery 112 is in the overcharged state, a shorter operation cycle leads to earlier cancellation of the overcharged state. In this manner, the CPU 132 of the monitoring apparatus 130 shortens the interval of monitoring operation to increase power consumption.

A-2-5. Second Low Power Consumption Processing:

In the second low power consumption processing, while the relay 160 is in the opened state, the CPU 132 of the monitoring apparatus 130 is temporarily activated from the stopped state and consumes power from the secondary battery 112 to repetitively execute operation of monitoring the secondary battery 112 (S340 to S350 and S410) at the first low power cycle ΔT2 longer than the reference cycle ΔT1. Specifically, the CPU 132 determines whether or not the first low power cycle ΔT2 has elapsed from execution of the most recent monitoring operation (including S130 to S150 and S170 to S190) (S330).

The CPU 132 stands by if the CPU 132 determines that the first low power cycle ΔT2 has not elapsed from execution of the most recent monitoring operation (NO in S330), and executes monitoring operation if the CPU 132 determines that the first low power cycle ΔT2 has elapsed from execution of the most recent monitoring operation (YES in S330). Specifically, the CPU 132 acquires the terminal voltage value V of the secondary battery 112 (S340), and determines whether or not the overdischarging state of the secondary battery 112 is canceled in accordance with the acquired result (S350). The CPU 132 according to the present embodiment determines that the overdischarging state of the secondary battery 112 is canceled under a condition that the secondary battery 112 receives voltage not less than predetermined voltage or the terminal voltage of the secondary battery 112 becomes not less than discharge recovery voltage (less than the upper limit voltage value VT1) larger than the lower limit voltage value VT2. This condition exemplifies a predetermined discharge recovery condition.

Execution of the second low power consumption operation processing achieves the following effects. As described above, the secondary battery 112 comes into the nonchargeable-nondischargeable state when the relay 160 is in the opened state. This inhibits decrease in voltage of the secondary battery 112 due to discharge to the starter 400 and the load 500. However, the monitoring apparatus 130 consumes power to decrease the terminal voltage value V of the secondary battery 112 and further deteriorate the overdischarging state. In contrast, the second low power consumption processing includes operation of monitoring the secondary battery 112 at the operation cycle longer than that of the second reference operation processing. This inhibits decrease in voltage of the secondary battery 112 due to power consumption by the monitoring apparatus 130. In other words, when the overdischarging state brings the relay 160 into the opened state, protection of the secondary battery 112 against overdischarge is prioritized over quick response to a command to activate the starter 400 and the load 500, to inhibit the monitoring apparatus 130 from becoming inoperable and inhibit the secondary battery 112 from becoming unreusable due to the terminal voltage value V of the secondary battery 112 becoming lower than the minimum operating voltage value VT4 of the monitoring apparatus 130.

In a case where the CPU 132 determines that the overdischarging state of the secondary battery 112 is canceled (YES in S3500), the CPU 132 brings the relay 160 from the opened state into the closed state (S410), and the process flow then returns to step S110 in FIG. 2. In another case where the CPU 132 determines that the overdischarging state of the secondary battery 112 is not canceled (NO in S350), the CPU 132 keeps the relay 160 in the opened state, and determines whether or not the terminal voltage value V of the secondary battery 112 is not more than a low voltage threshold VT3 in accordance with the acquired result in step S340 (S360). The low voltage threshold VT3 is less than the lower limit voltage value VT2 and more than the minimum operating voltage value VT4.

In a case where the CPU 132 determines that the terminal voltage value V of the secondary battery 112 is more than the low voltage threshold VT3 (NO in S360), the terminal voltage value V of the secondary battery 112 still less possibly becomes not more than the minimum operating voltage value VT4. In this case, the process flow returns to step S320 with the operation cycle being kept at the first low power cycle ΔT2. In another case where the CPU 132 determines that the terminal voltage value V of the secondary battery 112 is not more than the low voltage threshold VT3 (YES in S360), the terminal voltage value V of the secondary battery 112 highly possibly becomes not more than the minimum operating voltage value VT4. In this case, the process flow returns to step S320 with the operation cycle being changed from the first low power cycle ΔT2 to a longer second low power cycle ΔT3. In other words, the CPU 132 of the monitoring apparatus 130 extends the interval of monitoring operation to suppress power consumption. Operation of monitoring the secondary battery 112 is thereafter executed at a longer operation cycle, to more effectively inhibit decrease in voltage of the secondary battery 112 due to power consumption by the monitoring apparatus 130.

A-3. Advantages of the Present Embodiment

When the load 500 is in operation (i.e. the movable body such as a vehicle is traveling, is traveling at high speed, is stopped without idling, or is stopped) while the relay 160 is in the opened state, prompt restart of power supply to the load 500 is highly required. In a case where the vehicle is traveling or is traveling at high speed, the power generator 200 such as an alternator is in operation. Immediate recovery of the relay 160 is desired when the secondary battery 112 returns into the chargeable state in order to avoid uncontrollability of the vehicle due to power loss. In a different case where the vehicle is stopped without idling or is stopped, the power generator 200 such as an alternator is under suspension but a passenger is boarding the vehicle and is ready to find overdischarge and execute charging work (or execute charging work within several hours). The monitoring apparatus 130 is not discharged into an inoperable state in this case.

In comparison to a case where the load 500 is in operation, it is not highly required to promptly restart power supply to the load 500 under suspension (i.e. the movable body such as a vehicle is parked or is parked for a long period). In an exemplary case where the vehicle is parked, the vehicle is located at a safe place such as a parking lot. There is thus no need to immediately recover the relay 160 after the relay 160 is opened, but the relay 160 is desired to be left with power consumption as low as possible. In another case where the vehicle is parked for a long period, the vehicle is not used for a long period and the secondary battery 112 is desired to delay reaching unreusable low voltage as much as possible. Such a state where the vehicle is not used for a long period can be detected by voltage of the secondary battery 112 becoming lower than a predetermined level after the relay 160 is opened.

In view of this, when the load 500 is under suspension while the relay 160 is in the opened state, monitoring operation according to the present embodiment is executed at a longer interval with less power consumption from the secondary battery 112 per unit time, in comparison to the case where the load 500 is in operation.

Figure 3:
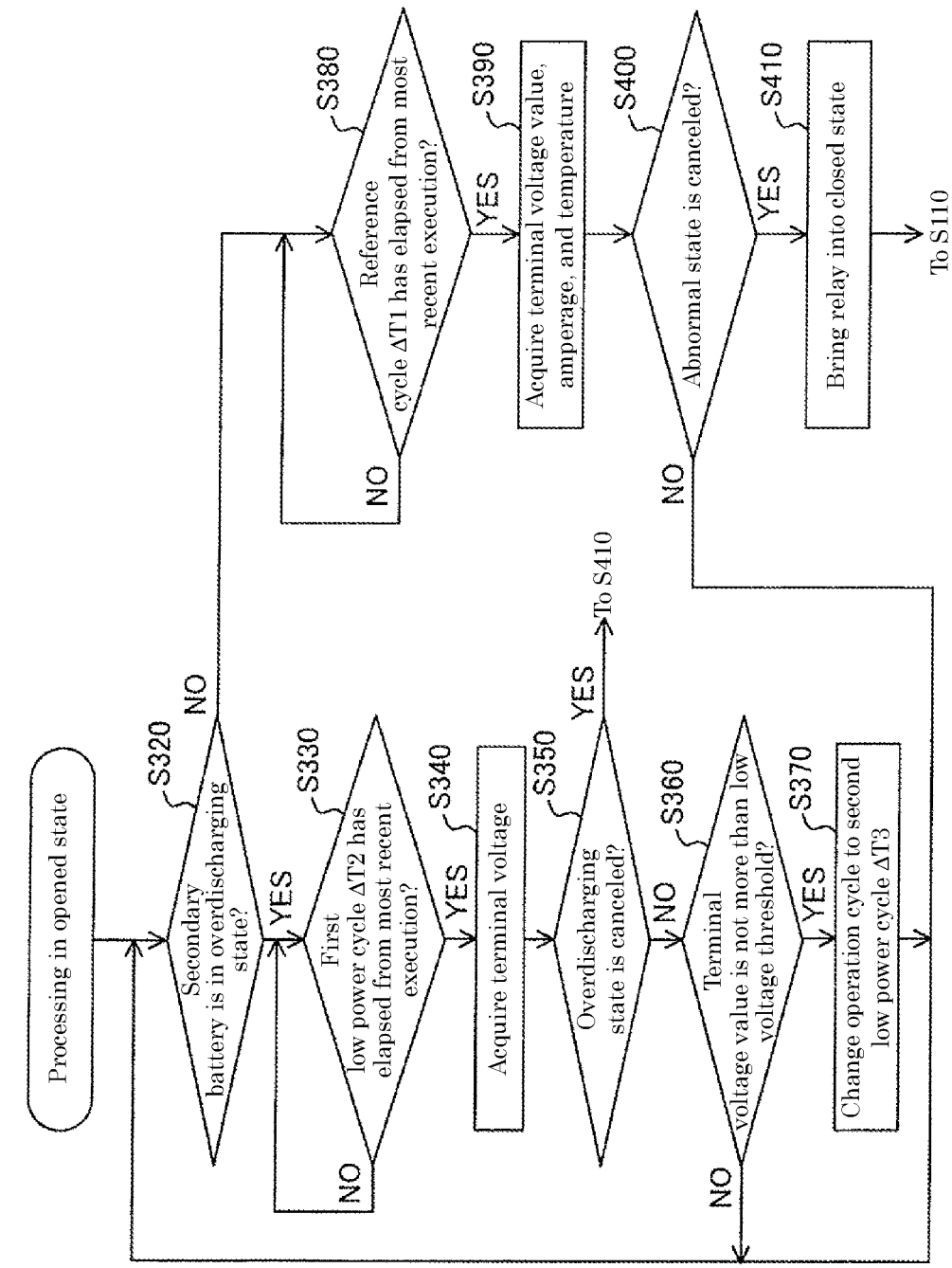
FIG. 3 is a flowchart depicting a process flow in an opened state according to the embodiment.

Specifically, the second low power consumption processing (S330 to S350 and S410) in the processing in the opened state depicted in FIG. 3 is executed at a longer interval with less power consumption from the secondary battery 112 per unit time, in comparison to the first reference operation processing (S120 to S150) executed after the relay 160 comes into the opened state in step S150 depicted in FIG. 2. In other words, the CPU 132 of the monitoring apparatus 130 extends the interval of monitoring operation to suppress power consumption. While the relay 160 is in the opened state, this inhibits delayed restart of power supply to the load 500 when the load 500 is in operation and the secondary battery 112 becomes not in the overdischarging state, as well as inhibits decrease in voltage of the secondary battery 112 by extending the interval of monitoring operation while the load 500 is under suspension with relatively low necessity for restart of power supply to the load 500.

When the secondary battery 112 comes into the overcharged state to bring the relay 160 into the opened state, it is desired to decrease the voltage of the secondary battery 112 through discharge. The secondary battery 112 in the overcharged state is desired to discharge in order to return into a normal voltage range as soon as possible. In view of this, when the secondary battery 112 comes into the overcharged state to bring the relay 160 into the opened state (NO in S320 in FIG. 3) while the load 500 is under suspension, monitoring operation according to the present embodiment is executed at a shorter interval with more power consumption from the secondary battery 112 per unit time, in comparison to the case where the secondary battery 112 comes into the overdischarging state to bring the relay 160 into the opened state (YES in S320). In other words, the CPU 132 of the monitoring apparatus 130 shortens the interval of monitoring operation to increase power consumption. This achieves, when the secondary battery 112 comes into the overcharged state to bring the relay 160 into the opened state while the load 500 is under suspension, prompter cancellation of the overcharged state of the secondary battery 112 by decreasing of the terminal voltage value V of the secondary battery 112 in comparison to a case of setting the interval of monitoring operation equally to the case where the secondary battery 112 is in the overdischarging state.

According to the present embodiment, in the case where the secondary battery 112 comes into the overcharged state to bring the relay 160 into the opened state while the load 500 is under suspension, the interval of monitoring operation (see S380 to S410 in FIG. 3) is shorter than the interval of monitoring operation (see S160 to S190 in FIG. 2) in the case where the relay 160 is in the closed state. In other words, the CPU 132 of the monitoring apparatus 130 shortens the interval of monitoring operation to increase power consumption. Power supply to the load 500 can thus be restarted more promptly at the start of operation of the load 500 in comparison to a case where the interval of monitoring operation with the relay 160 coming into the opened state due to the overcharged state of the secondary battery 112 is not less than the interval of monitoring operation with the relay 160 being in closed state.

B. Modification Examples

The technique disclosed in the present application is not limited to the embodiment described above, but can be modified in various modes within the range not departing from the purpose thereof, and can be modified in the following exemplary manners.

The monitoring apparatus 130 according to the above embodiment includes the single CPU 132. The monitoring apparatus 130 is not limited thereto in terms of its configuration, but can include a plurality of CPUs, can include hardware circuitry such as an application specific integrated circuit (ASIC), or can include both the CPU and the hardware circuitry.

The battery pack 100 according to the above embodiment includes the single monitoring apparatus 130. The battery pack 100 can alternatively include a plurality of monitoring apparatuses 130.

The load is not necessarily provided to an electric component but can be provided to a motor configured to drive an electric vehicle (EV), a different electric instrument, or a driving source (e.g. a motor) of industrial machinery. The charger is not limited to an alternator but can be installed at a charging station located outside the automobile.

The relay 160 according to the above embodiment exemplifies the switch, which is not limited to a mechanical type but can be a semiconductor switch or the like. The switch is not necessarily incorporated in the battery pack 100 but can alternatively be provided outside the battery pack 100. The switch can still alternatively be configured by a plurality of relays connected parallelly.

The energy storage device according to the above embodiment is exemplified by a lithium ion secondary battery. The energy storage device is not limited thereto, but examples thereof include a different secondary battery, a primary battery, and a capacitor. The energy storage device is not limited to an assembled battery having a plurality of cells, but can be a battery having a single cell.

The examples of the abnormal state determined in step S140 in FIG. 2 have only to include at least the overdischarging state. The examples of the abnormal state include, in addition to the overcharged state, the excessive current state, and the temperature abnormal state, an abnormal state of internal resistance, open circuit voltage (OCV), an SOC, or the like of the energy storage device. The processing in step S140 can alternatively include determining whether or not the secondary battery 112 possibly comes into an abnormal state. For example, the CPU 132 can alternatively determine whether or not the terminal voltage value V of the secondary battery 112 is not more than the discharge voltage threshold slightly higher than the lower limit voltage value VT2. The CPU 132 can still alternatively determine whether or not the terminal voltage value V of the secondary battery 112 is not less than the charge voltage threshold slightly lower than the upper limit voltage value VT1.

In the processing in the opened state, the CPU 132 can alternatively skip the processing in step S320 and execute the second low power consumption processing (S330 to S350 and S410) regardless of the type of the abnormal state. In the processing in the opened state, the process flow of the CPU 132 can return to step S320 by skipping the processing in steps S360 and S370 if the CPU 132 determines that the overdischarging state is not canceled (NO in S350).

In the processing in the opened state, the CPU 132 can execute the second low power consumption operation processing also in the case where the secondary battery 112 is in the excessive current state, the temperature abnormal state, or the like, in addition to the overdischarging state. When the vehicle is parked or is parked for a long period, the vehicle is located at a safe place such as a parking lot or is not used for a long period. There is thus no need to immediately recover after the relay 160 is opened, and the secondary battery 112 is desired to delay reaching unusable low voltage as much as possible.

The first reference operation processing and the second reference operation processing can be different from each other in terms of the cycle of monitoring operation and the power consumption level. Furthermore, first low power consumption operation processing and the second low power consumption operation processing can be different from each other in terms of the cycle of monitoring operation and the power consumption level.

The load 500 can be defined as being under suspension while the movable body such as a vehicle is stopped without idling or is stopped. Specifically, the load 500 can be assumed to be in operation when the movable body is traveling or is traveling at high speed, and the load 500 can be assumed to be under suspension when the movable body is stopped without idling, is stopped, is parked, or is parked for a long period.

The CPU 132 can alternatively be configured to execute monitoring operation at a longer interval (the first low power cycle ΔT2 or the second low power cycle ΔT3) as the movable body is parked for a longer period. In other words, the CPU 132 can be configured to execute monitoring operation at a longer cycle when the movable body is parked for a long period, in comparison to a case where the movable body is parked for a short period.

Table 1 below collectively indicates relations between the voltage values described above and the intervals of monitoring operation. In this table, VT1 denotes the predetermined upper limit voltage value, VT2 denotes the predetermined lower limit voltage value, VT4 denotes the minimum operating voltage value allowing the monitoring apparatus 130 to be operable, and VT3 denotes the low voltage threshold lower than VT2 and higher than VT4. These values satisfy the relation VT1>VT2>VT3>VT4. Furthermore, ΔT1 denotes the reference cycle, ΔT2 denotes the first low power cycle, and ΔT3 denotes the second low power cycle. These values satisfy the relation ΔT1<ΔT2<ΔT3.

TABLE 1

| State of load | Terminal voltage value V | Interval of monitoring operation | Remarks |
|---|---|---|---|
| In operation | No condition for V | ΔT1 | |
| Under suspension | V ≥ VT1 | ΔT1 | Overcharged state |
| | VT1 > V > VT2 | ΔT2 | Charge or discharge recovery condition |
| | VT2 ≥ V > VT3 | ΔT2 | Overdischarging state |
| | VT3 ≥ V > VT4 | ΔT3 | |

The interval of monitoring operation can be set to ΔT2 when V=VT1 is established, or the interval can be set to ΔT2 when V=VT3 is established. Table 1 does not indicate a case where V is not more than VT4 as the monitoring apparatus 130 is inoperable in the range.

DESCRIPTION OF REFERENCE SIGNS

100: battery pack
112: secondary battery
122: voltage sensor
130: monitoring apparatus
132: CPU
134: memory
136: communication interface
140: current sensor
150: temperature sensor
160: relay
200: power generator
400: starter
500: load
600: ECU
ΔT1: reference cycle
ΔT2: first low power cycle
ΔT3: second low power cycle
V: terminal voltage value
VT1: upper limit voltage value
VT2: lower limit voltage value
VT3: low voltage threshold
VT4: minimum operating voltage value

The invention claimed is:

1. A monitoring apparatus for an energy storage device provided at a movable body and electrically connected to a load of the movable body via a switch, the monitoring apparatus comprising:
    a monitoring unit supplied with power from the energy storage device,
    wherein the monitoring unit executes a monitoring operation of bringing the switch from a closed state into an opened state under a condition that the energy storage device has a voltage not more than a discharge voltage threshold, and bringing the switch from the opened state into the closed state under a condition that the switch is in the opened state and the energy storage device satisfies a predetermined discharge recovery condition, and extends an interval of the monitoring operation when the movable body is parked while the switch is in the opened state, in comparison to a case where the movable body is not parked.

2. The monitoring apparatus for the energy storage device according to claim 1, wherein
    the energy storage device is further electrically connected, via the switch, to a charger configured to generate power with an engine of the movable body,
    the monitoring operation further includes bringing the switch from the closed state into the opened state under a condition that the voltage of the energy storage device becomes not less than a charge voltage threshold larger than the discharge voltage threshold, and bringing the switch from the opened state into the closed state under a condition that the energy storage device satisfies a predetermined charge recovery condition when the switch is in the opened state, and
    the monitoring unit increases power consumption by shortening the interval of the monitoring operation when the voltage of the energy storage device becomes not less than the charge voltage threshold to bring the switch into the opened state while the movable body is parked, in comparison to a case where the voltage of the energy storage device becomes not more than the discharge voltage threshold to bring the switch into the opened state.

3. The monitoring apparatus for the energy storage device according to claim 2, wherein
    when the voltage of the energy storage device becomes not less than the charge voltage threshold to bring the switch into the opened state while the movable body is parked, power consumption is increased by shortening the interval of the monitoring operation, in comparison to a case where the switch is in the closed state.

4. The monitoring apparatus for the energy storage device according to claim 1, wherein
    the monitoring unit further decreases power consumption by extending the interval of the monitoring operation when the voltage of the energy storage device becomes not more than a low voltage threshold lower than the discharge voltage threshold while the switch is in the opened state, in comparison to a case where the voltage of the energy storage device is larger than the low voltage threshold.

5. The monitoring apparatus for the energy storage device according to claim 2, wherein
    the monitoring unit further decreases power consumption by extending the interval of the monitoring operation when the voltage of the energy storage device becomes not more than a low voltage threshold lower than the discharge voltage threshold while the switch is in the opened state, in comparison to a case where the voltage of the energy storage device is larger than the low voltage threshold.

6. The monitoring apparatus for the energy storage device according to claim 3, wherein
    the monitoring unit further decreases power consumption by extending the interval of the monitoring operation when the voltage of the energy storage device becomes not more than a low voltage threshold lower than the discharge voltage threshold while the switch is in the opened state, in comparison to a case where the voltage of the energy storage device is larger than the low voltage threshold.

7. An energy storage apparatus comprising:
    an energy storage device; and
    the monitoring apparatus for the energy storage device according to claim 1.

8. An energy storage apparatus comprising:
    an energy storage device; and
    the monitoring apparatus for the energy storage device according to claim 2.

9. An energy storage apparatus comprising:
    an energy storage device; and
    the monitoring apparatus for the energy storage device according to claim 3.

10. An energy storage apparatus comprising:
    an energy storage device; and
    the monitoring apparatus for the energy storage device according to claim 4.

11. The energy storage apparatus according to claim 7, further comprising:
    a switch disposed between the load of the movable body and the energy storage device.

12. The energy storage apparatus according to claim 8, further comprising:
    a switch disposed between the load of the movable body and the energy storage device.

13. The energy storage apparatus according to claim 9, further comprising:
    a switch disposed between the load of the movable body and the energy storage device.

14. The energy storage apparatus according to claim 10, further comprising:
a switch disposed between the load of the movable body and the energy storage device.

15. A method of monitoring an energy storage device provided at a movable body and electrically connected to a load of the movable body via a switch, the method executed by a monitoring apparatus for the energy storage device and comprising:
executing a monitoring operation of bringing the switch from a closed state into an opened state under a condition that the energy storage device has a voltage not more than a discharge voltage threshold, and bringing the switch from the opened state into the closed state under a condition that the switch is in the opened state and the energy storage device satisfies a predetermined discharge recovery condition; and
decreasing power consumption by extending an interval of the monitoring operation when the movable body is parked while the switch is in the opened state, in comparison to a case where the movable body is not parked.

16. The method of monitoring the energy storage device according to claim 15, wherein
the energy storage device is further electrically connected, via the switch, to a charger configured to generate power with an engine of the movable body,
the monitoring operation further includes bringing the switch from the closed state into the opened state under a condition that the voltage of the energy storage device becomes not less than a charge voltage threshold larger than the discharge voltage threshold, and bringing the switch from the opened state into the closed state under a condition that the energy storage device satisfies a predetermined charge recovery condition when the switch is in the opened state, and
the monitoring apparatus increases power consumption by shortening the interval of the monitoring operation when the voltage of the energy storage device becomes not less than the charge voltage threshold to bring the switch into the opened state while the movable body is parked, in comparison to a case where the voltage of the energy storage device becomes not more than the discharge voltage threshold to bring the switch into the opened state.

17. The method of monitoring apparatus the energy storage device according to claim 16, wherein
when the voltage of the energy storage device becomes not less than the charge voltage threshold to bring the switch into the opened state while the movable body is parked, power consumption is increased by shortening the interval of the monitoring operation, in comparison to a case where the switch is in the closed state.

18. The method of monitoring the energy storage device according to claim 15, wherein
the monitoring apparatus further decreases power consumption by extending the interval of the monitoring operation when the voltage of the energy storage device becomes not more than a low voltage threshold lower than the discharge voltage threshold while the switch is in the opened state, in comparison, to a case where the voltage of the energy storage device is larger than the low voltage threshold.

* * * * *